(12) United States Patent
Babu Narayanan et al.

(10) Patent No.: US 11,923,687 B2
(45) Date of Patent: Mar. 5, 2024

(54) BIPOLE POWER TRANSMISSION SCHEMES

(71) Applicant: General Electric Technology GmbH, Baden (CH)

(72) Inventors: Mita Babu Narayanan, Stafford (GB); Omar Jasim, Stafford (GB)

(73) Assignee: General Electric Technology GmbH, Baden (CH)

( * ) Notice: Subject to any disclaimer, the term of this patent is extended or adjusted under 35 U.S.C. 154(b) by 71 days.

(21) Appl. No.: 17/910,687

(22) PCT Filed: Mar. 16, 2021

(86) PCT No.: PCT/EP2021/056707
§ 371 (c)(1),
(2) Date: Sep. 9, 2022

(87) PCT Pub. No.: WO2021/185849
PCT Pub. Date: Sep. 23, 2021

(65) Prior Publication Data
US 2023/0140103 A1  May 4, 2023

(30) Foreign Application Priority Data
Mar. 18, 2020 (EP) .................................... 20275059

(51) Int. Cl.
*H02J 3/38* (2006.01)
*H02J 3/00* (2006.01)

(52) U.S. Cl.
CPC .............. *H02J 3/381* (2013.01); *H02J 3/001* (2020.01); *H02J 2300/28* (2020.01)

(58) Field of Classification Search
CPC ...... H02J 3/36; H02J 3/38; H02J 3/381; H02J 3/001; Y02E 60/60
See application file for complete search history.

(56) References Cited

U.S. PATENT DOCUMENTS

| | | | |
|---|---|---|---|
| 2013/0128630 A1* | 5/2013 | Jensen ...................... | H02J 3/36 363/35 |
| 2018/0109109 A1* | 4/2018 | Holmgren ................. | H02J 1/06 |
| 2018/0145499 A1* | 5/2018 | Gupta .................... | H02H 7/268 |

FOREIGN PATENT DOCUMENTS

| | | |
|---|---|---|
| EP | 3561985 A1 | 10/2019 |
| JP | S55109126 A | 8/1980 |

(Continued)

OTHER PUBLICATIONS

International Search Report and Written Opinion in PCT/EP2021/056707 dated Jun. 18, 2021 (18 pages).

*Primary Examiner* — Hal Kaplan
*Assistant Examiner* — Rasem Mourad
(74) *Attorney, Agent, or Firm* — Eversheds Sutherland (US) LLP

(57) ABSTRACT

A bipole power transmission scheme with two independent converts, two power feed and one return conduit. During operation of the bipole power transmission scheme under abnormal conditions, when a return conduit is faulty and unable to provide a return current path, each converter controller is programmed to monitor the first power feed in the first transmission conduit and the second power feed in the second transmission conduit and, if the first power feed in the first transmission conduit and the second power feed in the second transmission conduit differ from one another, at least one converter controller modifies the power infeed from its corresponding power source to reduce the difference between the first power feed and the second power feed.

11 Claims, 2 Drawing Sheets

(56) References Cited

FOREIGN PATENT DOCUMENTS

| | | | |
|---|---|---|---|
| JP | S62236328 A | | 10/1987 |
| JP | 2013161642 A | | 8/2013 |
| JP | 2017192276 A | * | 10/2017 |
| JP | 2017192276 A | | 10/2017 |

* cited by examiner

BIPOLE POWER TRANSMISSION SCHEMES

CROSS-REFERENCE TO RELATED APPLICATIONS

This application is a U.S. National Stage Application under 35 U.S.C. § 371 and claims the priority benefit of International Application No. PCT/EP2021/056707, filed Mar. 16, 2021, which claims priority to European Application No. 20275059.2, filed Mar. 18, 2020, both of which are incorporated herein by reference.

TECHNICAL FIELD

This invention relates to a bipole power transmission scheme and to a method of operating such a scheme.

BACKGROUND OF THE INVENTION

In high voltage direct current (HVDC) power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks.

The conversion between DC power and AC power is utilised where it is necessary to interconnect DC and AC networks. In any such power transmission network, converters (i.e. power converters) are required at each interface between AC and DC power to effect the required conversion from AC to DC or from DC to AC.

The choice of the most suitable HVDC power transmission scheme within a HVDC power transmission network differs, depending on the application and scheme features. One type of such scheme is a bipole power transmission scheme.

SUMMARY OF THE INVENTION

According to a first aspect of the invention there is provided a bipole power transmission scheme comprising a first converter station positioned in-use remote from a second converter station, and first and second transmission conduits and a return conduit to in-use interconnect the first converter station with the second converter station and thereby permit the first converter station to transmit power to the second converter station, the first converter station including:
a first power converter having a first DC terminal connected with the first transmission conduit, a second DC terminal connected with the return conduit, and at least one AC terminal electrically connected with a first variable power source, the first power converter further having a first converter controller programmed to control the transfer of a first power infeed from the first power source into the first transmission conduit in the form of a first power feed; and
a second power converter having a first DC terminal connected with the second transmission conduit, a second DC terminal connected with the return conduit, and at least one AC terminal electrically connected with a second variable power source, the second power converter further having a second converter controller programmed to control the transfer of a second power infeed from the second power source into the second transmission conduit in the form of a second power feed, the first power converter and associated first power source operating independently of the second power converter and associated second power source during operation of the bipole power transmission scheme under normal conditions whereby the first power infeed into the first transmission conduit and the second power infeed into the second transmission conduit are independent of one another, and during operation of the bipole power transmission scheme under abnormal conditions when the return conduit is faulty and unable to provide a return current path, each converter controller being programmed to monitor the first power feed in the first transmission conduit and the second power feed in the second transmission conduit and, if the first power feed in the first transmission conduit and the second power feed in the second transmission conduit differ from one another, at least one converter controller modifying the power infeed from its corresponding power source to reduce the difference between the first power feed and the second power feed.

In use, when the return conduit is faulty and unable to provide a return current path, any imbalance, i.e. difference, in the respective power feed in each of the first and second transmission conduits results in a current imbalance between the first and second transmission conduits which, in the absence of a functioning return conduit, must instead be transmitted through the ground. Such transmission is undesirable, not least because of concerns about an adverse impact on, e.g. marine life, and the corrosion of pipes within the ground.

Having at least one converter controller which modifies the power infeed from its corresponding power source to reduce the difference in the power being carried by each transmission conduit, i.e. reduce the difference between the first power feed and the second power feed, thereby advantageously reduces the magnitude of the imbalance current that otherwise has to flow through the ground. In turn, this beneficially reduces the adverse impact of such a current flow, while at the same time allowing each power source to continue providing power and thereby, in use, avoiding a highly undesirable interruption to power transmission from the first converter station to the second converter station.

Such modification of the power infeed is also able to begin as soon as the return conduit becomes inoperative, and so helps to minimise the time during which a large imbalance current might otherwise flow.

In addition, having at least one such converter controller which is able to act based solely on monitoring the first power feed in the first transmission conduit and the second power feed in the second transmission conduit, provides for an arrangement which is able to operate in isolation without any other external input, e.g. from the second converter station, and so avoids the need for dedicated (and often expensive) telecommunications between converter stations.

Preferably the converter controller modifying the power infeed from its corresponding power source to reduce the difference between the first power feed and the second power feed is programmed to modify its said power infeed so that the power feed in each transmission conduit matches one another.

Having such a matched power feed in each transmission conduit, during abnormal operation of the bipole power transmission scheme, i.e. in the absence of a functional return conduit, is highly desirable because it all but eliminates the current imbalance between the transmission conduits, and so essentially avoids the flow of current through the ground, all while continuing to allow each power source to provide power and continuing, in use, to transmit that power to the second converter station.

In a preferred embodiment of the invention each power source includes at least one power controller that regulates the power infeed provided by the said power source according to an operating frequency of the power source and its associated power converter, and each converter controller is programmed to modify the power infeed from its corresponding power source by modifying the operating frequency at which its corresponding power converter operates.

In this manner the operating frequency of a given power converter and its associated power source can be used to communicate the power demand, i.e. power infeed required from the power source, according to the operating conditions of the bipole power transmission scheme as a whole.

In another preferred embodiment of the invention the first converter controller is programmed to reduce the first power infeed from the first power source if the first power feed in the first transmission conduit is greater than the second power feed in the second transmission conduit, and the second converter controller is programmed to reduce the second power infeed from the second power source if the second power feed in the second transmission conduit is greater than the first power feed in the first transmission conduit.

Having first and second converter controllers so programmed is beneficial for certain types of power source, such as those which it is more straightforward to throttle, or otherwise reduce, the power infeed they provide, as opposed to readily increasing it.

The first converter station may be an offshore converter station and at least one of the first and second power sources may be an offshore wind park.

Optionally the or each offshore wind park includes a plurality of wind turbines, each of which includes a power controller in the form of an individual turbine power controller that regulates the power provided by the individual wind turbine according to the operating frequency of the wind turbine.

The drive to reduce carbon emissions means that there is an increasing demand for renewable energy sources, and so the applicability of the invention to offshore wind parks, and individual wind turbines, is very advantageous.

Moreover, the independent manner in which the invention is able to operate is particularly suitable for such installations since it avoids the need for any input from a second converter station, e.g. an onshore converter station, which might be located extremely distant from the first converter station and thereby make any communication between the two extremely difficult and/or unreliable.

Preferably at least one wind turbine includes a power dissipation element which is selectively operable by the corresponding turbine power controller to temporarily dissipate the power infeed provided by the individual wind turbine.

The inclusion of such a power dissipation element provides the opportunity to temporarily reduce the power provided by the corresponding wind turbine. Such a temporary reduction can, in turn, be used by a turbine power controller to accommodate the finite amount of time needed to mechanically adjust the pitch of turbine blades in order to modify the actual power output by the turbine, i.e. following the turbine power controller observing a change in the operating frequency of an associated power converter which signifies the need for the power output of the wind turbine to be modified, e.g. so as to contribute towards temporarily reducing the overall power infeed provided by the associated offshore wind park.

The bipole power transmission scheme may additionally include a first excess power absorber electrically connected between the first transmission conduit and the return conduit, and a second excess power absorber electrically connected between the second transmission conduit and the return conduit, the corresponding one of the excess power absorbers being used to absorb power from one or other of the first and second transmission conduits, while a change in the power feed in the said first or second transmission conduit is taking place.

The inclusion of such excess power absorbers provides an alternative means of accommodating a finite amount of time that might be needed to alter the actual power provided by a given first or second power source.

The bipole power transmission scheme may further include a second converter station interconnected with the first converter station by the first and second transmission conduits and the return conduit.

Including such a second converter station provides the opportunity for end-to-end control of the entire bipole power transmission scheme.

According to a second aspect of the invention there is provided a method of operating a bipole power transmission scheme comprising a first converter station positioned in-use remote from a second converter station, and first and second transmission conduits and a return conduit to in-use interconnect the first converter station with the second converter station and thereby permit the first converter station to transmit power to the second converter station, the first converter station including:
a first power converter having a first DC terminal connected with the first transmission conduit, a second DC terminal connected with the return conduit, and at least one AC terminal electrically connected with a first variable power source, the first power converter further having a first converter controller programmed to control the transfer of a first power infeed from the first power source into the first transmission conduit in the form of a first power feed; and
a second power converter having a first DC terminal connected with the second transmission conduit, a second DC terminal connected with the return conduit, and at least one AC terminal electrically connected with a second variable power source, the second power converter further having a second converter controller programmed to control the transfer of a second power infeed from the second power source into the second transmission conduit in the form of a second power feed, the method comprising the steps of:
operating the bipole power transmission scheme under normal conditions by having the first power converter and associated first power source operate independently of the second power converter and associated second power source whereby the first power infeed into the first transmission conduit and the second power infeed into the second transmission conduit are independent of one another, and
operating the bipole power scheme during abnormal conditions when the return conduit is faulty and unable to provide a return current path, by having each converter controller monitor the first power feed in the first transmission conduit and the second power feed in the second transmission conduit and, if the first power feed in the first transmission conduit and the second power feed in the second transmission conduit differ from one another, having at least one converter controller modify the power infeed from its corresponding power source to reduce the difference between the first power feed and the second power feed.

The method of the invention shares the benefits of the corresponding features of the bipole power transmission scheme of the invention.

It will be appreciated that the use of the terms "first" and "second", and the like, in this patent specification is merely intended to help distinguish between similar features (e.g. the first and second transmission conduits, and the first and second power converters), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

There now follows a brief description of preferred embodiments of the invention, by way of non-limiting example, with reference being made to the following figures in which.

DETAILED DESCRIPTION

Figure 1:
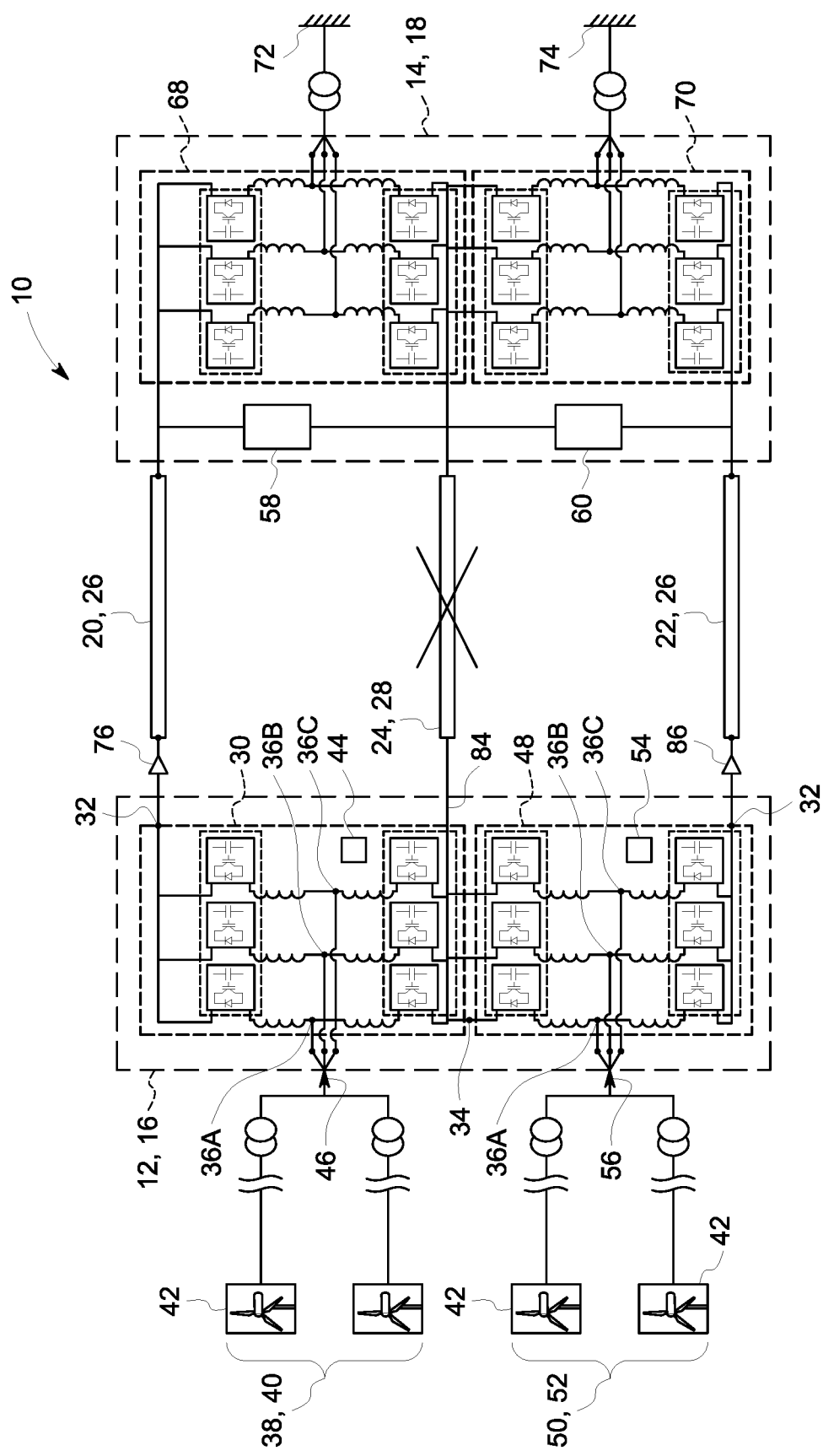
FIG. 1 shows a schematic view of a bipole power transmission scheme according to a first embodiment of the invention.

A bipole power transmission scheme according to a first embodiment of the invention is designated generally by reference numeral 10, as shown in FIG. 1.

The bipole power transmission scheme 10 includes a first converter station 12 which is positioned remotely from a second converter station 14. In the embodiment shown, the first converter station 12 is an offshore converter station 16 and the second converter station 14 is an onshore converter station 18, although in other embodiments of the invention this need not necessarily be the case, e.g. both converter stations 12, 14 may be onshore converter stations.

Moreover, in the embodiment shown the bipole power transmission scheme 10 of the invention includes the second converter station 14, i.e. the onshore converter station 18, but other embodiments of the invention may include only the first converter station 12, e.g. only an offshore converter station. Such other embodiments of the invention may be applicable when a third party owns or manages the second converter station and the downstream power transmission network associated therewith, and it is intended for the bipole power transmission scheme of the invention to interoperate with such a second converter station and associated power transmission network.

Returning to the embodiment shown, the first and second converter stations 12, 14, i.e. the offshore and onshore converter stations 16, 18, are interconnected by first and second transmission conduits 20, 22, i.e. first and second 'poles' (hence the scheme constituting a 'bipole' scheme), and a return conduit 24 which permit the first, offshore converter station 16 to transmit power to the second, onshore converter station 18.

Each of the first and second transmission conduits 20, 22 is or includes a subsea cable 26, although in other embodiments of the invention one or other transmission conduit might be, or include, an underground cable, an overhead line, or a mixture of such cables and line.

Meanwhile, the return conduit 24 is or includes a dedicated metallic return 28, which typically takes the form of a further subsea cable 26, although an electrical conductor of some other form may be used.

The first, offshore converter station 16 includes a first power converter 30 which has a first DC terminal 32 that is connected with the first transmission conduit 20 and a second DC terminal 34 which is connected with the return conduit 24. The aforementioned return conduit 24 is connected to ground 84, which desirably serves as a reference against which the first and second DC terminals 32, 34 can be compared.

The first power converter 30 also includes three AC terminals 36A, 36B, 36C, each of which corresponds to a respective phase A, B, C of a first variable power source 38 with which the AC terminals 36A, 36B, 36C are electrically connected.

In the embodiment shown, the first variable power source 38 is a first offshore wind park 40 which includes a plurality of wind turbines 42. Each wind turbine 42 includes a power controller in the form of an individual turbine power controller (not shown), which may take the form of a local phase-locked loop (PLL) controller, but that in any event regulates the power provided by the individual wind turbine 42 according to the operating frequency of the wind turbine 42.

In addition to the foregoing, the first power converter 30 also includes its own first converter controller 44 that is programmed to control the transfer of a first power infeed 46 from the first power source 38, i.e. the first offshore wind park 40, into the first transmission conduit 20 in the form of a first power feed 76, which is a DC power feed.

Each wind turbine 42 also includes a power dissipation element (not shown), such as a dynamic braking resistor, which can be used to temporarily dissipate the individual power provided each wind turbine 42, such individual power contributions otherwise combining to define the first power infeed 46 from the first offshore wind park 40 as a whole. More particularly, the first offshore wind park 40 is configured as an offshore AC grid and the first power infeed 46 takes the form of an AC power infeed, although such a configuration and type of power infeed need not necessarily be the case in other embodiments of the invention, however. In addition, the first converter controller 44 controls the first power converter 30 in a manner whereby it provides a voltage to the offshore AC grid, i.e. to the first offshore wind park 40.

The first power converter 30 shown is a voltage source converter, although other types of power converter can be used.

The voltage source converter shown has a known configuration which includes three converter limbs that extend between the first and second DC terminals 32, 34, and which correspond to the respective phases A, B, C of the first power source 38. Each converter limb includes first and second limb portions which are separated by a corresponding AC terminal 36A, 36B, 36C.

Each limb portion includes a chain-link converter which extends between the associated AC terminal 36A, 36B, 36C and a corresponding one of the first or the second DC terminal 32, 34. Each chain-link converter includes a plurality of series connected chain-link modules, while each chain-link module includes a number of switching elements which are connected in parallel with an energy storage device in the form of a capacitor (although other types of energy storage device, i.e. any device that is capable of storing and releasing energy to selectively provide a voltage, e.g. a fuel cell or battery, may also be used however).

The provision of a plurality of chain-link modules means that it is possible to build up a combined voltage across each chain-link converter, via the insertion of the energy storage devices, i.e. the capacitors, of multiple chain-link modules (with each chain-link module providing its own voltage), which is higher than the voltage available from each individual chain-link module.

Accordingly, each of the chain-link modules work together to permit the chain-link converter to provide a stepped variable voltage source. This permits the generation of a voltage waveform across each chain-link converter using a step-wise approximation. As such each chain-link converter is capable of providing a wide range of complex waveforms.

For example, operation of each chain-link converter in the foregoing manner can be used to generate an AC voltage waveform at each AC terminal 36A, 36B, and thereby enable the voltage source converter to provide the aforementioned power transfer functionality, i.e. the transfer of the first power infeed 46 from the first power source 38, i.e. the first offshore wind park 40, into the first transmission conduit 20.

The first, offshore converter station 16 also includes a second power converter 48, which is also a voltage source converter and is configured in essentially the same manner as the first power converter 30, as described hereinabove.

The second power converter 48 does, however, have a first DC terminal 32 that is connected with the second transmission conduit 22, while its second DC terminal 34 is similarly connected with the return conduit 24.

Each of the three AC terminals 36A, 36B, 36C of the second power converter 48 is electrically connected with a second variable power source 50.

In the embodiment shown, the second variable power source 50 is a second offshore wind park 52, which similarly includes a plurality of wind turbines 42. Each wind turbine 42 again includes a power controller in the form of an individual turbine power controller (not shown), e.g. in the form of a local phase-locked loop (PLL) controller, that regulates the power provided by the individual wind turbine 42 according to the operating frequency of the wind turbine 42.

The second power converter 48 also similarly includes its own second converter controller 54 that is programmed to control the transfer of a second power infeed 56 from the second power source 50, i.e. the second offshore wind park 52, into the second transmission conduit 22 in the form of a second power feed 86, which is similarly a DC power feed.

Each wind turbine 42 in the second offshore wind park 52 similarly also includes a power dissipation element (not shown) which can be used to temporarily dissipate the individual power provided each wind turbine 42, such individual power contributions again otherwise combining to define the second power infeed 56 from the second offshore wind park 52 as a whole. As with the first offshore wind park 40, the second offshore wind park 52 is similarly configured as an offshore AC grid and the second power infeed 56 again takes the form of an AC power infeed. Such a configuration and type of power infeed, again, need not necessarily be the case in other embodiments of the invention. In addition, the second converter controller 54 similarly controls the second power converter 48 in a manner whereby it provides a voltage to the offshore AC grid, i.e. to the second offshore wind park 52.

In addition to the foregoing, the bipole power transmission scheme 10 also includes a first excess power absorber 58 which is electrically connected between the first transmission conduit 20 and the return conduit 24, as well as a second excess power absorber 60 that is electrically connected between the second transmission conduit 22 and the return conduit 24. In the embodiment shown, both excess power absorbers 58, 60 are located within the second converter station 14, i.e. the onshore converter station 18, although this need not necessarily be the case.

Each excess power absorber 58, 60 is preferably a dynamic braking system, although other types of power absorber may be used. In any event, a given excess power absorber 58, 60 is configured so that it can be used to absorb power from the corresponding one the first and second transmission conduits 20, 22 with which it is connected.

Meanwhile, in the embodiment shown the second, onshore converter station 18 includes third and fourth power converters 68, 70 which are also voltage source converters, essentially configured in the same manner as the first and second power converters 30, 48 in the first, offshore converter station 16, albeit in a mirror image fashion. Other types of power converter, as well as other configurations of power converter, may however be included instead in the second, onshore converter station 18. The third and fourth power converters 68, 70 are configured to transfer the corresponding first or second power feed 76, 86, i.e. a respective DC power feed, from the corresponding first or second transmission conduit 20, 22 to a corresponding first or second AC network 72, 74. In other embodiments of the invention, however, the third and fourth power converters may instead be configured to transfer the first and second power feeds, i.e. the DC power feeds from the first and second conduits, to a single AC network.

During operation of the bipole power transmission scheme 10 under normal conditions the first power converter 30 and associated first power source 38 operate independently of the second power converter 48 and associated second power source 50, such that the first power infeed 46 into the first transmission conduit 20 and the second power infeed 56 into the second transmission conduit 22 are completely independent of one another. In other words, the individual offshore wind parks 40, 52 are able to feed power into each transmission conduit 20, 22 independently of one another.

In contrast, during operation of the bipole power transmission scheme 10 under abnormal conditions, which in the context of the invention is when the return conduit 24 is faulty and unable to provide a return current path (or is damaged or inoperative to the extent that it has to be disconnected from the scheme 10), each of the first and second converter controllers 44, 54 is programmed to monitor the first power feed 76 in the first transmission conduit 20 and the second power feed 86 in the second transmission conduit 22.

The first and second converter controllers 44, 54 may monitor each of the first and second power feed 76, 86 in the corresponding transmission conduit 20, 22 either directly by measuring or otherwise calculating the respective power feed 76, 86, or indirectly via measuring or otherwise calculating the corresponding power infeed 46, 56 from the associated first or second power source 38, 50 and determining from that an actual or expected power feed 76, 86 in the corresponding first or second transmission conduit 20, 22, e.g. based on the operating parameters of the corresponding first or second power converter 30, 48.

More particularly, the said converter controllers 44, 54 are further programmed such that if the first power feed 76 in the first transmission conduit 20 and the second power feed 86 in the second transmission conduit 22 differ from one another, at least one converter controller 44, 54 modifies the power infeed 46, 56 from its corresponding power source 38, 50 to reduce the difference between the first power feed 76 and the second power feed 86.

Moreover, whichever converter controller 44, 54 is modifying the power infeed 46, 56 from its corresponding power source 38, 50 to reduce the difference between the first power feed 76 and the second power feed 86 is programmed to modify the said power infeed 46, 56 so that the power feed 76, 86 in each transmission conduit 20, 22 matches one another.

As indicated above, each power source 38, 50 includes a plurality of power controllers, i.e. the individual turbine power controllers of each wind turbine 42, that together regulate the power infeed 46, 56 provided by the said power source 38, 50 according to an operating frequency of the power source 38, 50 and its associated power converter 30, 48, i.e. regulates the power provided by each individual wind turbine 42 according to the operating frequency at which all of the wind turbines 42 within a given offshore wind park 40, 52 is working.

Furthermore, each converter controller 44, 54 is programmed to modify the power infeed 46, 56 from its corresponding power source 38, 50 by modifying the operating frequency at which its corresponding power converter 30, 48 operates which, in turn, modifies the operating frequency at which all of the wind turbines 42 within the corresponding offshore wind park 40, 52 are forced to work.

Figure 2:
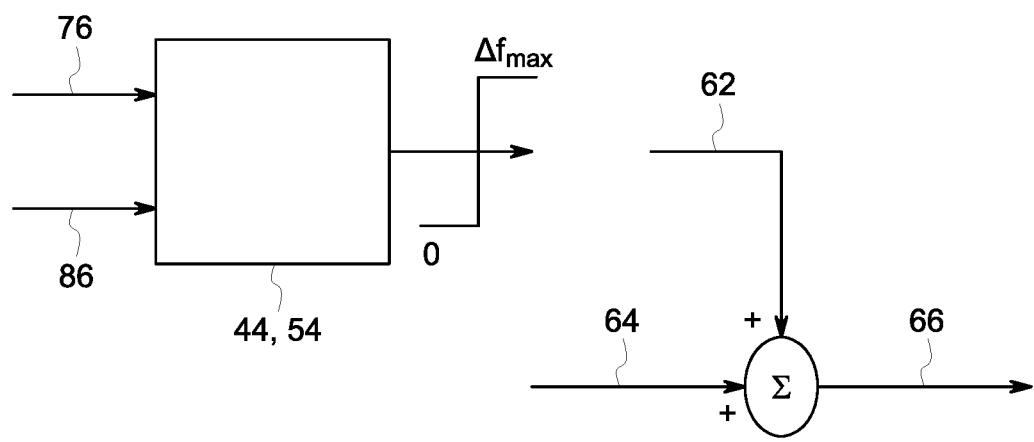
FIG. 2 illustrates a possible control algorithm for a converter controller forming a part of the bipole power transmission scheme shown in FIG. 1.

In other words, during operation of the bipole power transmission scheme 10 under the aforementioned abnormal conditions, each converter controller 44, 54 is programmed, as illustrated schematically in FIG. 2, to:

monitor the first and second power feed 76, 86 in the respective first and second transmission conduits 20, 22; and if the first and second power feeds 76, 86 differ from one another;

one converter controller 44, 54 determines a required operating frequency change 62 to cause the nominal operating frequency 64 at which its corresponding power converter 30, 48 is currently operating to change to a new operating frequency 66 which, in turn, will regulate the power infeed 46, 56 provided by the corresponding first or second power source 38, 50 to a desired extent so that the first and second power feed 76, 86 match one another.

More particularly still, the first converter controller 44 is programmed to reduce the first power infeed 46 from the first power source 38 if the first power feed 76 in the first transmission conduit 20 is greater than the second power feed 86 in the second transmission conduit 22, and the second converter controller 54 is programmed to reduce the second power infeed 56 from the second power source 50 if the second power feed 86 in the second transmission conduit 22 is greater than the first power feed 76 in the first transmission conduit 20, such that in each instance the first and second power feeds 76, 86 match one another.

In practice, when each turbine power controller detects a change in the operating frequency of the power converter 30, 56 into which it is feeding power, and hence a change to the operating frequency at which the associated wind turbine 42 is required to work, the respective turbine power controller changes the power reference for the wind turbine 42 and thereafter mechanically adjusts the pitch of the turbine blades of the wind turbine 42 to realise the required reduction in power output of the wind turbine 42.

Although each turbine power controller is able to respond very quickly to a change to the operating frequency at which the associated wind turbine 42 is required to operate, typically in 100 milliseconds or less, changing the pitch of each turbine blade takes a greater amount of time. As a consequence, there is a commensurate finite amount of time before a respective power infeed 46, 56 can be reduced in order, in turn, to reduce the difference in power feed 76, 86 in the transmission conduits 20, 22 and ultimately eliminate that difference.

Likewise there would otherwise remain a finite period of time, following failure of the return conduit 24 and the start of operating the bipole power transmission scheme 10 under abnormal conditions when, as a result of the imbalance in the power feed 76, 86 in each transmission conduit 20, 22 an imbalance current would flow through the ground, with the attendant adverse impact of this on, e.g. marine life and pipe corrosion.

To obviate such an impact while a respective power feed 76, 86 is being reduced, i.e. during the mechanical response time of individual wind turbines 42, the corresponding first or second excess power absorber 58, 60, e.g. corresponding dynamic braking system, connected with the transmission conduit 20, 22 having the larger power feed 76, 86 can be operated to temporarily absorb an amount of power necessary to temporarily equalise the first and second power feed 76, 86 in the first and second transmission conduits 20, 22.

Alternatively, while a reduction in a respective power feed 76, 86 is being achieved, i.e. during the aforesaid mechanical response time of individual wind turbines 42, the individual power dissipation element, e.g. dynamic braking resistor, included in each wind turbine 42 can be operated to temporarily dissipate a commensurate individual amount of power that each wind turbine 42 provides, so as to temporarily reduce as necessary the combined overall power infeed 46, 56 from the associated power source 38, 50, i.e. from the associated first or second offshore wind park 40, 52 as a whole, to temporarily equalise the first and second power feed 76, 86 in the first and second transmission conduits 20, 22.

We claim:

1. A bipole power transmission scheme comprising a first converter station positioned in-use remote from a second converter station, and first and second transmission conduits and a return conduit to in-use interconnect the first converter station with the second converter station and thereby permit the first converter station to transmit power to the second converter station, the first converter station including:
a first power converter having a first DC terminal connected with the first transmission conduit, a second DC terminal connected with the return conduit, and at least one AC terminal electrically connected with a first variable power source, the first power converter further having a first converter controller programmed to control the transfer of a first power infeed from the first power source into the first transmission conduit in the form of a first power feed; and
a second power converter having a first DC terminal connected with the second transmission conduit, a second DC terminal connected with the return conduit, and at least one AC terminal electrically connected with a second variable power source, the second power converter further having a second converter controller programmed to control the transfer of a second power infeed from the second power source into the second transmission conduit in the form of a second power feed,
the first power converter and associated first power source operating independently of the second power converter and associated second power source during operation of the bipole power transmission scheme under normal conditions whereby the first power infeed into the first transmission conduit and the second power infeed into the second transmission conduit are independent of one another, and
during operation of the bipole power transmission scheme under abnormal conditions when the return conduit is faulty and unable to provide a return current path, each converter controller being programmed to monitor the first power feed in the first transmission conduit and the second power feed in the second transmission conduit and, when the first power feed in the first transmission conduit and the second power feed in the second transmission conduit differ from one another, at least one converter controller modifying the power infeed from its corresponding power source to reduce the difference between the first power feed and the second power feed.

2. A bipole power transmission scheme according to claim 1, wherein the converter controller modifying the power infeed from its corresponding power source to reduce the difference between the first power feed and the second power feed is programmed to modify its said power infeed so that the power feed in each transmission conduit matches one another.

3. A bipole power transmission scheme according to claim 1, wherein each power source includes at least one power controller that regulates the power infeed provided by the said power source according to an operating frequency of the power source and its associated power converter, and each converter controller is programmed to modify the power infeed from its corresponding power source by modifying the operating frequency at which its corresponding power converter operates.

4. A bipole power transmission scheme according to claim 1, wherein the first converter controller is programmed to reduce the first power infeed from the first power source if the first power feed in the first transmission conduit is greater than the second power feed in the second transmission conduit, and the second converter controller is programmed to reduce the second power infeed from the second power source if the second power feed in the second transmission conduit is greater than the first power feed in the first transmission conduit.

5. A bipole power transmission scheme according to claim 1, wherein each converter controller is programmed to monitor the first power feed in the first transmission conduit and the second power feed in the second transmission conduit either:
directly; or
indirectly via the corresponding power infeed from the associated first or second power source.

6. A bipole power transmission scheme according to claim 1, wherein the first converter station is an offshore converter station and at least one of the first and second power sources is an offshore wind park.

7. A bipole power transmission scheme according to claim 6, wherein the or each offshore wind park includes a plurality of wind turbines, each of which includes a power controller in the form of an individual turbine power controller that regulates the power provided by the individual wind turbine according to the operating frequency of the wind turbine.

8. A bipole power transmission scheme according to claim 7, wherein at least one wind turbine includes a power dissipation element which is selectively operable by the corresponding turbine power controller to temporarily dissipate the power infeed provided by the individual wind turbine.

9. A bipole power transmission scheme according to claim 1, additionally including a first excess power absorber electrically connected between the first transmission conduit and the return conduit, and a second excess power absorber electrically connected between the second transmission conduit and the return conduit, the corresponding one of the excess power absorbers being used to absorb power from one or other of the first and second transmission conduits, while a change in the power feed in the said first or second transmission conduit is taking place.

10. A bipole power transmission scheme according to claim 1, further including a second converter station interconnected with the first converter station by the first and second transmission conduits and the return conduit.

11. A method of operating a bipole power transmission scheme comprising a first converter station positioned in-use remote from a second converter station, and first and second transmission conduits and a return conduit to in-use interconnect the first converter station with the second converter station and thereby permit the first converter station to transmit power to the second converter station, the first converter station including:
a first power converter having a first DC terminal connected with the first transmission conduit, a second DC terminal connected with the return conduit, and at least one AC terminal electrically connected with a first variable power source, the first power converter further having a first controller programmed to control the transfer of a first power infeed from the first power source into the first transmission conduit in the form of a first power feed; and
a second power converter having a first DC terminal connected with the second transmission conduit, a second DC terminal connected with the return conduit, and at least one AC terminal electrically connected with a second variable power source, the second power converter further having a second controller programmed to control the transfer of a second power infeed from the second power source into the second transmission conduit in the form of a second power feed, the method comprising the steps of:

operating the bipole power transmission scheme under normal conditions by having the first power converter and associated first power source operate independently of the second power converter and associated second power source whereby the first power infeed into the first transmission conduit and the second power infeed into the second transmission conduit are independent of one another, and operating the bipole power scheme during abnormal conditions when the return conduit is faulty and unable to provide a return current path, by having each controller monitor the first power feed in the first transmission conduit and the second power feed in the second transmission conduit and, when the first power feed in the first transmission conduit and the second power feed into the second transmission conduit differ from one another, having at least one controller modify the power infeed from its corresponding power source to reduce the difference between the first power feed and the second power feed.

\* \* \* \* \*